(12) United States Patent
Humad

(10) Patent No.: US 10,628,416 B2
(45) Date of Patent: Apr. 21, 2020

(54) ENHANCED DATABASE QUERY PROCESSING

(71) Applicant: International Business Machines Corporation, Armonk, NY (US)

(72) Inventor: Chitwan Humad, Sydney (AU)

(73) Assignee: International Business Machines Corporation, Armonk, NY (US)

(*) Notice: Subject to any disclaimer, the term of this patent is extended or adjusted under 35 U.S.C. 154(b) by 562 days.

(21) Appl. No.: 15/168,817

(22) Filed: May 31, 2016

(65) Prior Publication Data
US 2017/0344549 A1   Nov. 30, 2017

(51) Int. Cl.
*G06F 16/2453* (2019.01)
*G06F 16/245* (2019.01)
*G06F 16/248* (2019.01)

(52) U.S. Cl.
CPC ........ *G06F 16/2454* (2019.01); *G06F 16/245* (2019.01); *G06F 16/248* (2019.01)

(58) Field of Classification Search
CPC .......... G06F 17/3046; G06F 17/30424; G06F 17/30554; G06F 16/245; G06F 16/248; G06F 16/2454
USPC ................................................. 707/690, 722
See application file for complete search history.

(56) References Cited

U.S. PATENT DOCUMENTS

| | | | |
|---|---|---|---|
| 5,367,675 A | 11/1994 | Cheng et al. | |
| 6,460,027 B1 | 10/2002 | Cochrane et al. | |
| 6,625,593 B1 * | 9/2003 | Leung | G06F 16/24532 |
| 6,718,320 B1 * | 4/2004 | Subramanian | G06F 16/24542 707/719 |
| 7,409,385 B2 | 8/2008 | Lindsay et al. | |
| 7,440,937 B2 | 10/2008 | Kiernan et al. | |
| 7,475,064 B2 | 1/2009 | Santosuosso | |
| 7,945,557 B2 * | 5/2011 | Cheng | G06F 17/30457 707/705 |
| 8,073,840 B2 * | 12/2011 | Smith | G06F 17/30498 707/714 |
| 8,818,987 B2 | 8/2014 | Barsness et al. | |
| 8,898,146 B2 | 11/2014 | Castellanos et al. | |
| 9,442,980 B1 * | 9/2016 | Trepetin | G06F 21/6254 |
| 2005/0289100 A1 * | 12/2005 | Dettinger | G06F 16/2425 |
| 2006/0064407 A1 * | 3/2006 | Santosuosso | G06F 17/3046 |
| 2008/0301085 A1 | 12/2008 | Faunce et al. | |

(Continued)

FOREIGN PATENT DOCUMENTS

CA    2519015 A1    3/2007

OTHER PUBLICATIONS

Glenn Norman Paulley, "Exploiting Functional Dependence in Query Optimization," Ph.D. Thesis in Computer Science, University of Waterloo, 2000, 334 pages, Waterloo, Ontario, Canada.

*Primary Examiner* — James Trujillo
*Assistant Examiner* — Jessica N Le
(74) *Attorney, Agent, or Firm* — Jason Petrokaitis; Ryan, Mason & Lewis, LLP

(57) ABSTRACT

A method includes receiving, from a client device, an enhanced database query for a union operation of a first query and at least a second query, parsing the enhanced database query to identify two or more parameters controlling handling of duplicate rows in the first query and the second query, evaluating the enhanced database query utilizing the parameters to generate a result table, and providing the result table to the client device.

20 Claims, 14 Drawing Sheets

(56) References Cited

U.S. PATENT DOCUMENTS

| | | | | |
|---|---|---|---|---|
| 2013/0006965 A1* | 1/2013 | Barbas | ............... | G06F 16/2454 |
| | | | | 707/718 |
| 2014/0095445 A1* | 4/2014 | Deshmukh | ........ | G06F 16/24568 |
| | | | | 707/661 |
| 2015/0220600 A1* | 8/2015 | Bellamkonda | ...... | G06F 16/2456 |
| | | | | 707/747 |
| 2015/0286679 A1* | 10/2015 | Dave | ................ | G06F 16/24558 |
| | | | | 707/718 |
| 2016/0019032 A1* | 1/2016 | Ritter | ..................... | G06F 8/313 |
| | | | | 717/114 |
| 2016/0140166 A1* | 5/2016 | Schechter | ................ | G06F 8/30 |
| | | | | 707/714 |
| 2016/0196310 A1* | 7/2016 | Dutta | ............... | G06F 17/30483 |
| | | | | 707/769 |
| 2016/0203182 A1* | 7/2016 | Nguyen | ............. | G06F 17/3046 |
| | | | | 707/768 |
| 2016/0299952 A1* | 10/2016 | Cialini | .................. | G06F 16/27 |
| 2016/0328446 A1* | 11/2016 | To | .................... | G06F 16/24549 |

* cited by examiner

| EMPLOYMENT MASTER TABLE (M_EMPLOYMENT) | | | | | ~602 |
|---|---|---|---|---|---|
| MonthID | NAME | SALARY | LOCATION | ID | |
| 201605 | A1 | 2563 | SYDNEY | 1 | |
| 201605 | A2 | 2452 | SYDNEY | 2 | |
| 201605 | A3 | 3800 | MELBOURNE | 3 | |
| 201605 | A4 | 3652 | CANBERRA | 4 | |
| 201605 | A5 | 3010 | MELBOURNE | 5 | |

| EMPLOYMENT TRANSACTION TABLE (T_EMPLOYMENT) | | | | | ~604 |
|---|---|---|---|---|---|
| MonthID | NAME | SALARY | LOCATION | ID | |
| 201605 | A3 | 4000 | SYDNEY | 3 | |
| 201605 | A4 | 3425 | MELBOURNE | 4 | |
| 201605 | A5 | 3010 | MELBOURNE | 5 | |
| 201605 | A6 | 2468 | MELBOURNE | 6 | |

FIG. 7

```
                                                                    ┌700
Select MonthID, Name, Salary, ID from
(
    (Select MonthID, Name, Salary, ID from M_Employment) Query_M
    UNION
    (Select MonthID, Name, Salary, ID from T_Employment) Query_T
)
```

| RESULT TABLE | | | | 702 |
|---|---|---|---|---|
| MonthID | NAME | SALARY | ID | |
| 201605 | A1 | 2563 | 1 | |
| 201605 | A2 | 2452 | 2 | |
| 201605 | A3 | 3800 | 3 | |
| 201605 | A4 | 3652 | 4 | |
| 201605 | A5 | 3010 | 5 | |
| 201605 | A3 | 4000 | 3 | |
| 201605 | A4 | 3425 | 4 | |
| 201605 | A6 | 2468 | 6 | |

FIG. 8

800:
Select MonthID, Name, Salary, ID from
(
(Select MonthID, Name, Salary, ID from M_Employment) Query_M
UNION (BASED ON Query_T PRESERVE Query_M.Salary, Query_T.Salary)
(Select MonthID, Name, Salary, ID from T_Employment) Query_T
)

801-1: SALARY OF SELECT COLUMN FROM M_EMPLOYMENT STORED IN-MEMORY

| SALARY | ID |
|---|---|
| 2563 | 1 |
| 2452 | 2 |
| 3800 | 3 |
| 3652 | 4 |
| 3010 | 5 |

801-2: SALARY OF SELECT COLUMN FROM T_EMPLOYMENT STORED IN-MEMORY

| SALARY | ID |
|---|---|
| 4000 | 3 |
| 3425 | 4 |
| 3010 | 5 |
| 2468 | 6 |

802: RESULT TABLE

| MonthID | NAME | SALARY | ID |
|---|---|---|---|
| 201605 | A1 | 2563 | 1 |
| 201605 | A2 | 2452 | 2 |
| 201605 | A6 | 2468 | 6 |
| 201605 | A3 | 4000 | 3 |
| 201605 | A4 | 3425 | 4 |
| 201605 | A5 | 3010 | 5 |

FIG. 10

```
Select MonthID, Name, Salary, ID from                                    ⌐1000
(
    (Select MonthID, Name Location, ID from M_Employment) Query_M
    UNION
    (Select MonthID, Name, Location, ID from T_Employment) Query_T
)
```

| RESULT TABLE | | | | 1002 |
|---|---|---|---|---|
| MonthID | NAME | LOCATION | ID | |
| 201605 | A1 | SYDNEY | 1 | |
| 201605 | A2 | SYDNEY | 2 | |
| 201605 | A3 | MELBOURNE | 3 | |
| 201605 | A4 | CANBERRA | 4 | |
| 201605 | A5 | MELBOURNE | 5 | |
| 201605 | A6 | MELBOURNE | 6 | |
| 201605 | A3 | SYDNEY | 3 | |
| 201605 | A4 | MELBOURNE | 4 | |

FIG. 11

```
Select MonthID, Name, Location, ID from
(
  (Select MonthID, Name, Location, ID from M_Employment) Query_M
  UNION (BASED ON Query_T.Location != Query_M.Location PRESERVE Query_M.Location, Query_T.Location)
  (Select MonthID, Name, Location, ID from T_Employment) Query_T
)
```
⎯1100

1101-1

| LOCATION OF SELECT COLUMN FROM M_EMPLOYMENT STORED IN-MEMORY | |
|---|---|
| SELECT1.Location | SELECT1.ID |
| SYDNEY | 1 |
| SYDNEY | 2 |
| MELBOURNE | 3 |
| CANBERRA | 4 |
| MELBOURNE | 5 |

1101-2

| LOCATION OF SELECT COLUMN FROM T_EMPLOYMENT STORED IN-MEMORY | |
|---|---|
| SELECT2.Location | SELECT2.ID |
| SYDNEY | 3 |
| MELBOURNE | 4 |
| MELBOURNE | 5 |
| MELBOURNE | 6 |

1102

| RESULT TABLE | | | |
|---|---|---|---|
| MonthID | NAME | LOCATION | ID |
| 201605 | A1 | SYDNEY | 1 |
| 201605 | A2 | SYDNEY | 2 |
| 201605 | A5 | MELBOURNE | 5 |
| 201605 | A6 | MELBOURNE | 6 |
| 201605 | A3 | SYDNEY | 3 |
| 201605 | A4 | MELBOURNE | 4 |

ENHANCED DATABASE QUERY PROCESSING

BACKGROUND

The present application relates to databases, and more specifically, to database queries. Various languages are used to interact with databases. Structure Query Language (SQL) is one standard query language that may be utilized to interact with databases. Various different types of queries may be used in SQL and other types of query languages including, by way of example, SELECT statements or queries. SELECT statements may be used to obtain or select data from a database. In some instances, additional operators may be used in conjunction with SELECT statements. UNION is an example of such an operator, which may be used to combine the results from two or more SELECT statements.

SUMMARY

Embodiments of the invention provide techniques for processing enhanced database queries.

For example, in one embodiment, a method comprises receiving, from a client device, an enhanced database query for a union operation of a first query and at least a second query, parsing the enhanced database query to identify two or more parameters controlling handling of duplicate rows in the first query and the second query, evaluating the enhanced database query utilizing the parameters to generate a result table, and providing the result table to the client device, wherein the method is performed by at least one processing device comprising a processor coupled to a memory.

BRIEF DESCRIPTION OF THE DRAWINGS

FIG. 6 depicts sample tables.

FIG. 7 depicts an example UNION database query using the sample tables of FIG. 6.

FIG. 8 depicts an example enhanced UNION database query using the sample tables of FIG. 6, according to an embodiment of the present invention.

FIG. 10 depicts another example UNION database query using the sample tables of FIG. 6.

FIG. 11 depicts another example enhanced UNION database query using the sample tables of FIG. 6, according to an embodiment of the present invention.

DETAILED DESCRIPTION

Illustrative embodiments of the invention may be described herein in the context of illustrative methods, systems and devices for enhanced database query execution. However, it is to be understood that embodiments of the invention are not limited to the illustrative methods, systems and devices but instead are more broadly applicable to other suitable methods, systems and devices.

Figure 1:
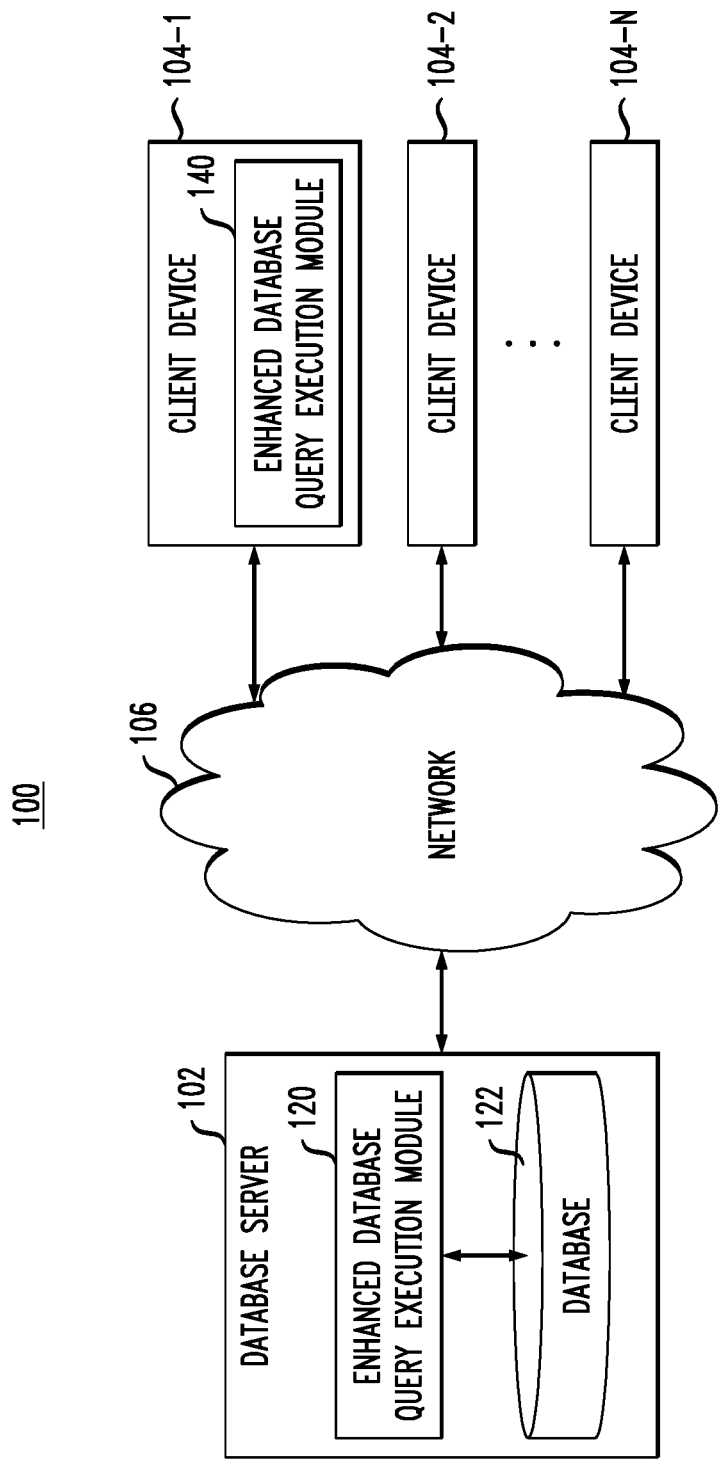
FIG. 1 depicts a system providing enhanced database query execution, according to an embodiment of the present invention.

FIG. 1 shows a system 100 for providing enhanced database query execution. The system 100 includes a database server 102 and client devices 104-1, 104-2, ..., 104-N, collectively referred to herein as client devices 104, coupled via network 106.

The database server 102 includes enhanced database query execution module 120 and database 122. Although FIG. 1 shows the database 122 being implemented internal to the database server 102, embodiments are not limited to this arrangement. In some embodiments, the database 122 may be implemented at least partially external to the database server 102. As an example, the database server 102 and database 122 may be connected via network 106. While system 100 shows a database server 102 that includes only a single database 122, embodiments are not limited to this arrangement. The database server 102 may be configured to interact with multiple different databases or database clients, with different ones of the databases being implemented at least partially internal or at least partially external to the database server 102. In addition, while system 100 shows an arrangement wherein a single database server 102 is associated with database 122, embodiments are not so limited. In some embodiments, multiple distinct database servers may be configured for interaction with or otherwise be associated with database 122.

The system 100 shows one in which the database server 102 and client devices 104 are distinct from one another and communicate over network 106. Embodiments, however, are not limited to this arrangement. In some cases, a client device such as client device 104-1 may itself incorporate database server 102.

As mentioned above, the database server 102 includes enhanced database query execution module 120. Enhanced database query execution module 120 is configured to allow the database server 102 to receive and process enhanced database queries from respective ones of the client devices 104. The enhanced database query execution module 120 for example, allows the database server 102 to parse enhanced database queries to identify specialized parameters or other syntax, to evaluate queries using such parameters or syntax, and to provide results back to client devices 104.

Client device 104-1 includes an enhanced database query execution module 140. Although not explicitly shown in FIG. 1, other ones of the client devices 104 may also include enhanced database query execution modules. The enhanced database query execution module 140 is configured to allow the client device 104-1 to generate and provide enhanced database queries to the database server 102. As an example, enhanced database query execution module 120 may provide user interface features that prompt for parameter input and format the input into appropriate syntax that can be understood by the enhanced database query execution module 120 of database server 102.

In some embodiments, client device 104-1 may interact directly with a database 122 rather than through database server 102. In such cases, the enhanced database query execution module 140 may be configured so as to perform the functionality of the enhanced database query execution module 120 described above and elsewhere herein.

Embodiments provide a number of advantages in query processing. For example, embodiments can allow for faster processing or query performance for UNION queries. In addition, embodiments can provide for enhancements to UNION queries with additional capabilities for selection amongst duplicate rows not possible in a conventional UNION query.

In some embodiments, the database server-side load is reduced by using the enhanced UNION database queries described herein by retrieving rows more effectively. The enhanced UNION database queries also allows developers or other users of client devices to fetch their choice of rows for output among different SELECT queries.

Conventional UNION queries are limited by a number of issues. For example, results of processing of the UNION operator between two or more SELECT queries will fetch a first common row for display in the output. In other words, the developer or client device cannot force the database server to retrieve a chosen or preferred row among SELECT queries.

Assume, as an example, that there are inner and outer queries where the inner query has a UNION operator between two or more SELECT queries and the outcome of the inner query joins with the outer query. The developer or client device, using a conventional UNION query, does not have the choice of printing a unique ID (for example, the primary key) because it may have different values in the two or more SELECT queries. While the developer may wish to print the primary key ID of the printed rows or output, this is not possible using a conventional UNION operation. Embodiments allow the developer or client device to make this choice, which can make the execution of further join conditions optimal as the database server will see the unique indexed column value to join at the outer query. As such, embodiments allow for smarter or enhanced UNION queries which helps in reducing multiple table read accesses in the execution plan of a database server.

In some embodiments, query design may be effected in a more compressive manner. For example, utilization of the enhanced UNION queries described herein can provide efficiencies relative to using complex combinations of other types of queries to try to approximate a same result. In addition to better and more compressive query design, execution of the enhanced UNION queries is more efficient at the database server. For example, the database server does not need to talk over existing processing, such as by trying to convert a UNION query to a complex combination of other queries to try to approximate the same result.

Figure 2:
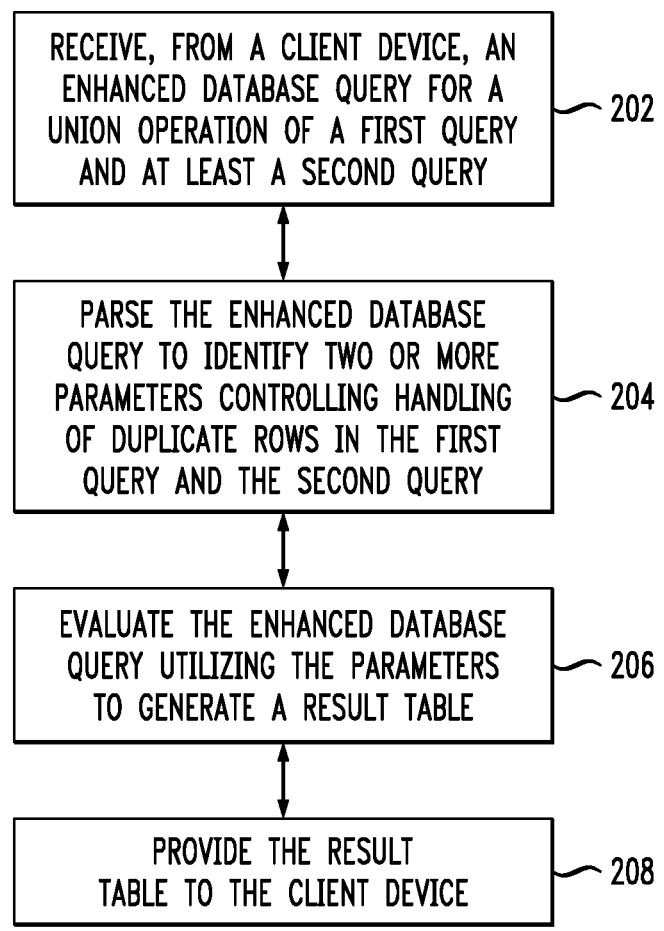
FIG. 2 depicts a process for enhanced database query execution, according to an embodiment of the present invention.

FIG. 2 shows a process 200 for enhanced database query execution. The process 200 may be performed by the enhanced database query execution module 120 of database server 102 in system 100. As mentioned above, in some cases client devices 104 may implement functionality associated with the database server 102 and enhanced database query execution module 120. In such cases, a client device may perform the process 200.

The process 200 begins with step 202, receiving, from a client device such as client device 104-1, an enhanced database query for a union operation of a first query and at least a second query. In step 204, the enhanced database query is parsed to identify two or more parameters controlling handling of duplicate rows in the first query and the second query. The enhanced database query is evaluated in step 206 utilizing the parameters to generate a result table, and the result table is provided to the client device in step 208.

In some embodiments, the parameters of the enhanced database query received in step 202 include a first parameter specifying one of the first query and the second query and a second parameter specifying one or more columns of a first table identified in the first query and one or more columns of a second table identified in the second query to ignore when performing the union operation. The ignored columns of the first table and the second table are stored in-memory of the database server 102 or other entity performing process 200 while evaluating the enhanced database query in step 206. The use of these parameters is also referred to herein as enhanced database query processing with based on and preserve syntax.

The enhanced database query received in step 202 may utilize the syntax or format UNION (BASED ON <parameter-1> PRESERVE <parameter-2>), where <parameter1> is the first parameter and <parameter2> is the second parameter. The first parameter, <parameter1>, lists one of the first query and the second query. The second parameter, <parameter2>, lists column names from the first table and the second table separated by commas. Step 204 may include parsing the syntax to identify <parameter-1> and <parameter-2>.

Using based on and preserve syntax, evaluating the enhanced database query in step 206 may include: setting a flag to ignore the one or more columns specified in the second parameter when processing the union operation; processing the union operation for the first query and the second query to obtain unique rows from the first table and the second table and to obtain a preferred row from one of the first table and the second table for duplicate rows in the first query and the second query, the preferred row being determined based on the first parameter; and generating the result table comprising the unique rows and the preferred rows, wherein column values for the one or more ignored columns in the result table are obtained from the columns of the first table and the second table stored in-memory based on the query specified by the first parameter. Detailed examples of processing queries using these parameters and syntax will be described in further detail below with respect to FIGS. 3 and 8.

In other embodiments, the parameters of the enhanced database query received in step 202 include a first parameter specifying a comparative operator between a first column value of the first query and a second column value of the second query and a second parameter specifying one or more columns of a first table identified in the first query and one or more columns of a second table identified in the second query to ignore when performing the union operation. The ignored columns of the first table and the second table are stored in-memory of the database server 102 or other entity performing process 200 while evaluating the enhanced database query in step 206. The use of these parameters is also referred to herein as enhanced query processing with conditional based on and preserve syntax.

The comparative operator may be, by way of example, not equal to or "!=". Using the not equal to comparative operator specifies a preferred row among duplicate rows when certain column values are unequal. The comparative operator may also specify maximum or minimum. Using maximum or minimum comparative operators can be used to specify that the preferred row among duplicate rows is the one with the minimum or maximum value. While certain examples are discussed below in which the enhanced database query uses only a single comparative operator for two column values for clarity of illustration, embodiments are not so limited. In some embodiments, the first parameter may utilize two or more different comparative operators for comparing different pairs of column values, as well as using combinations of comparative operators for a single pair of column values as will be discussed in further detail below.

The enhanced database query received in step 202 may utilize the syntax or format UNION (BASED ON <parameter-1> PRESERVE <parameter-2>), wherein <parameter1> is the first parameter and <parameter2> is the second parameter. The first parameter, <parameter-1>, lists a first column from one of the first query and the second query on a left side of the comparative operator and a second column from the other one of the first query and the second query on the second side of the comparative operator. The second parameter, <parameter-2>, lists column names from the first table and the second table separated by commas.

Using conditional based on and preserve syntax, evaluating the enhanced database query in step 206 may include: setting a flag to ignore the one or more columns specified in the second parameter when processing the union operation; processing the union operation for the first query and the second query to obtain unique rows from the first table and the second table and to obtain a preferred row from one of the first table and the second table for duplicate rows in the first query and the second query, the preferred row being determined based on the first parameter; and generating the result table comprising the unique rows and the preferred rows, wherein column values for the one or more ignored columns in the result table are obtained from the columns of the first table and the second table stored in-memory based on the comparative operator specified in the first parameter. Detailed examples of processing queries using these parameters and syntax will be described in further detail below with respect to FIGS. 4 and 10.

In some embodiments, database query execution is enhanced by utilizing the UNION operator with two additional arguments, e.g., the above-described parameters. The parameters are optional functional information or syntax that a developer or client device may provide. In the absence of specification of the additional syntax, the UNION operation may work normally as will be described in further detail below with respect to FIG. 5.

Figure 3:
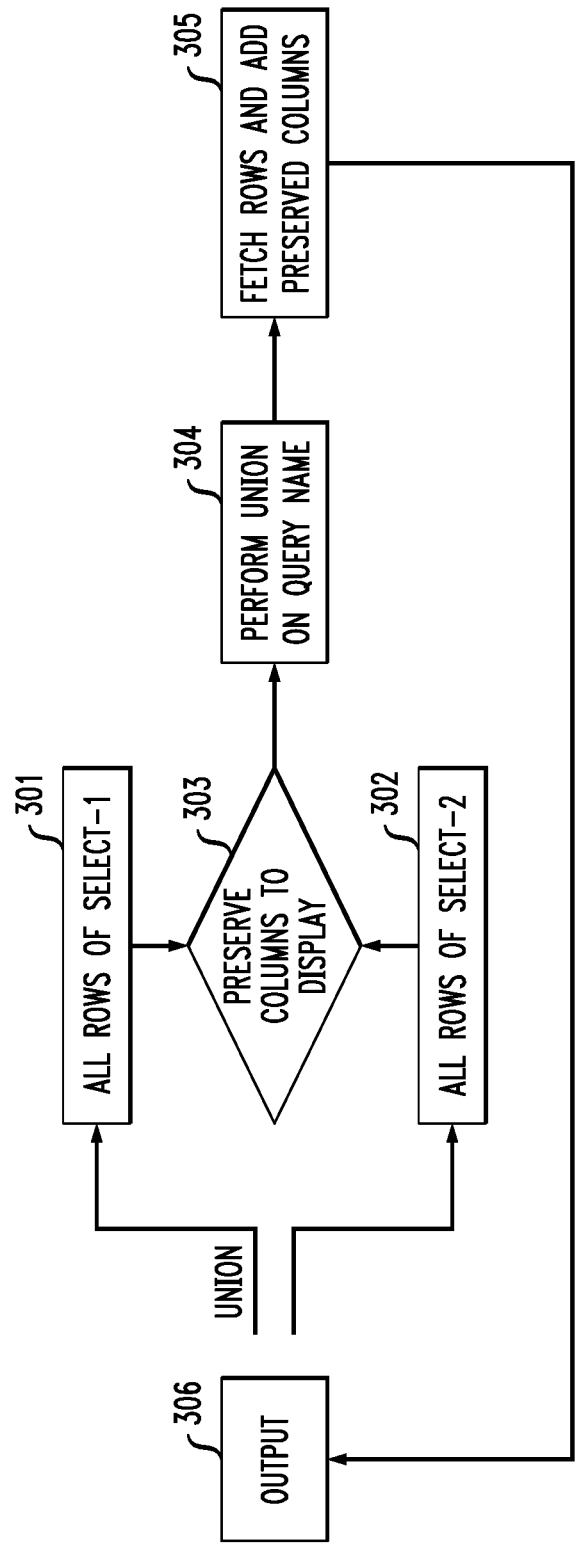
FIG. 3 depicts a process for enhanced database query execution with based on and preserve syntax, according to an embodiment of the present invention.

FIG. 3 depicts enhanced database query processing utilizing based on and preserve syntax. Using based on and preserve syntax allows for a configured query name's rows to be printed or output in the case of duplicate rows using BASED ON syntax. Certain columns may be ignored but preserved when processing the enhanced database query using PRESERVE syntax. FIG. 3 shows an example enhanced query in table 300. In the table 300, the right-hand column shows the specific syntax used while the left-hand column identifies the step in the flowchart corresponding to that syntax.

Enhanced database query processing begins with step 301, fetching the rows from the first select query, and step 302, fetching the rows from the second select query. In step 303, a flag is set to columns to ignore and preserve for display in the output or result table. These are the columns mentioned in the PRESERVE clause. In step 304, the query name which has been opted or selected for display in the output is set and the UNION query is run. In step 305, rows are fetched based on the UNION query. For unique rows, their respective values are read from the table data stored in-memory. For duplicate rows in Table_A and Table_B, the preferred row is read based on the query name set in step 304. The column(s) which have been set to preserve in step 303 are also pulled in step 305. In step 306, the result is output. Outputting the result may include providing a result table to a client device, or using the output for further processing. For example, the query 300 may be part of a larger query to be performed by a database server.

Figure 4:
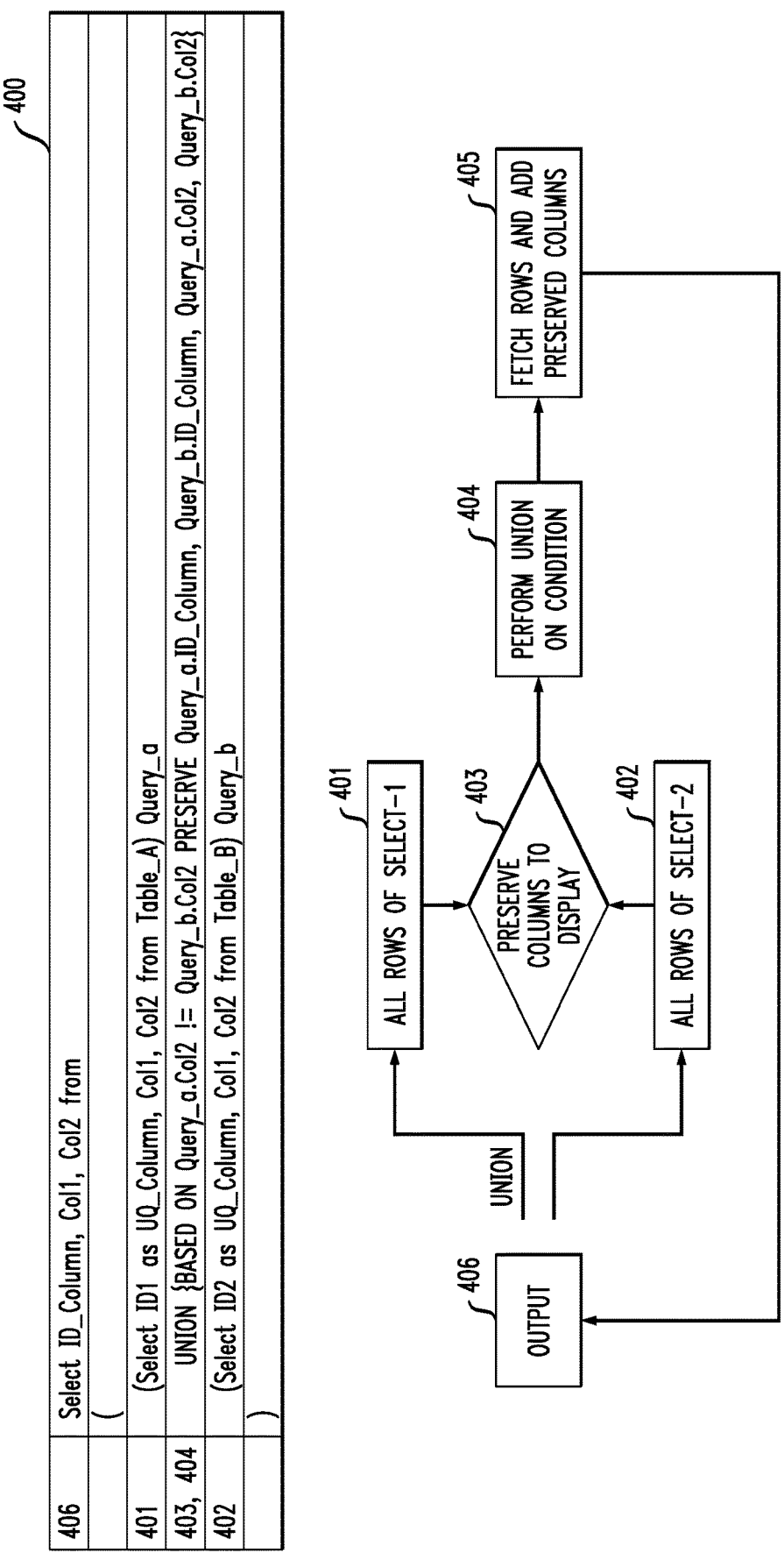
FIG. 4 depicts a process for enhanced database query execution with conditional based on and preserve syntax, according to an embodiment of the present invention.

FIG. 4 depicts enhanced database query processing utilizing conditional based on and preserve syntax. Using the conditional based on and preserve syntax allows for the choice of which query's rows to be printed or output in the case of duplicate rows to be controlled by an comparative operator. The FIG. 4 process may be viewed as uniquely filtering the two select queries based on a condition defined by one or more comparative operators. FIG. 4 shows an example enhanced query in table 400. In the table 400, the right-hand column shows the specific syntax used while the left-hand column identifies the step in the flowchart corresponding to that syntax.

In the FIG. 4 example, the comparative operator is not equal to. In this case, if Query_a and Query_b have duplicate rows having different values for Col2, the output will be the preferred query's rows, namely, Query_a or the query name on the left side of the comparative operator !=. It is to be appreciated that other types of comparative operators may be used. For example, maximum or minimum comparative operators may be used, such that for duplicate rows the maximum or minimum value would be printed. In addition, although FIG. 4 shows an example with only a single comparative operator in the BASED ON clause, multiple comparative operators may be used in other embodiments.

Enhanced database query processing begins with step 401, fetching the rows from the first select query, and step 402, fetching the rows from the second select query. In step 403, a flag is set to columns to ignore and preserve for display in the output or result table. These are the columns mentioned in the PRESERVE clause. In step 404, a flag is set on the columns that are going to be evaluated for a comparison. The comparison is controlled by the BASED ON parameter. Execution of the enhanced database query continues with step 405, where the UNION query is run for unique rows. In the case of duplicate rows in Table_A and Table_B, the preferred row is read based on the comparative operator. The columns which have been set to preserve in step 403 are also pulled in step 405. In step 406, the result is output. Similar to the FIG. 3 process, outputting the result may include providing a result table to a client device, or using the output for further processing, e.g., the query 400 may be part of a larger query to be performed by a database server.

Figure 5:
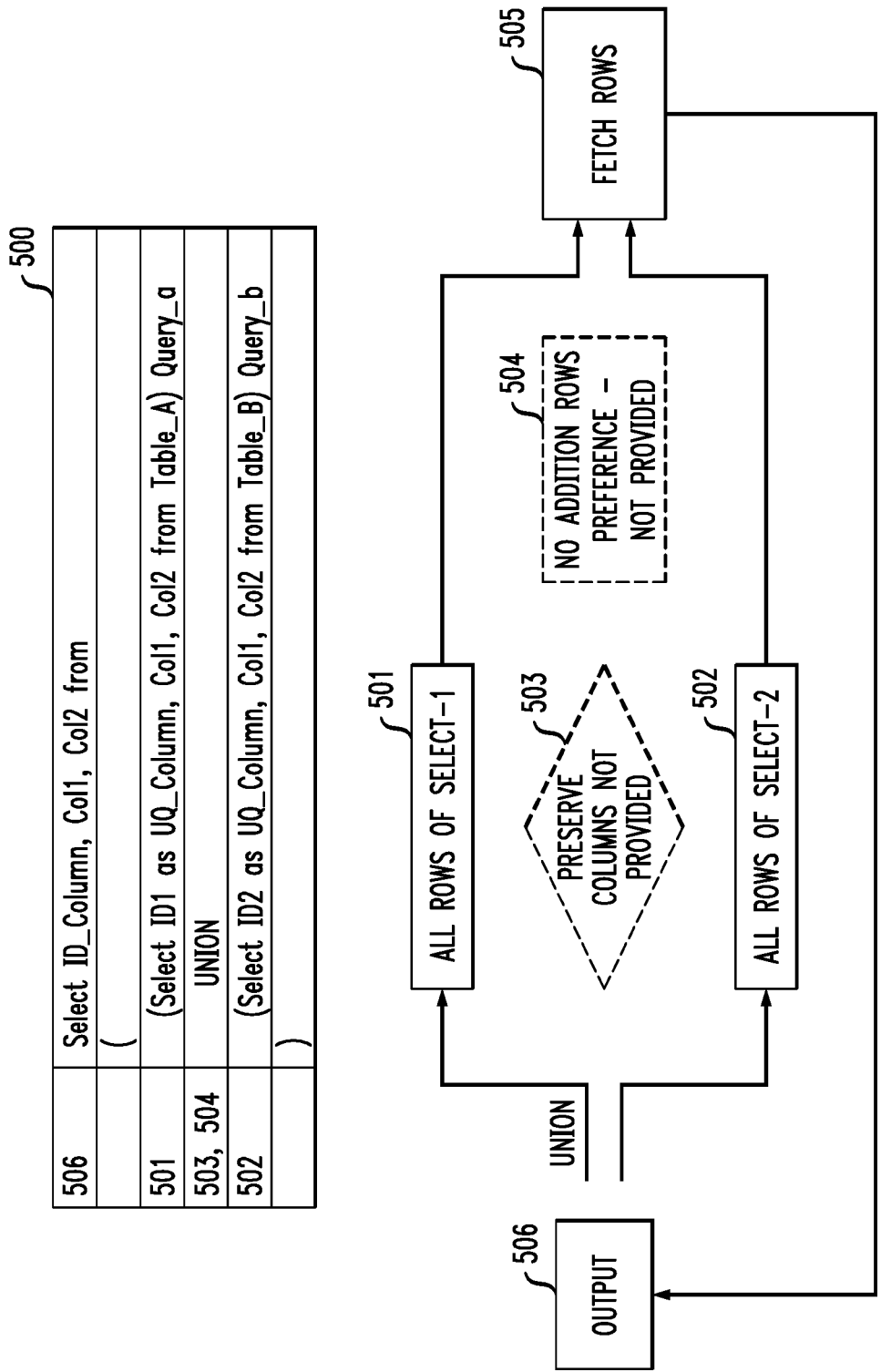
FIG. 5 depicts a process for enhanced database query execution without based on or preserve syntax, according to an embodiment of the present invention.

FIG. 5 depicts a process for enhanced database query execution when based on and preserve syntax is not provided. FIG. 5 shows a table 500, with the right-hand column showing syntax and the left-hand column indicating the step in flowchart corresponding to that syntax. As depicted, processing the query 500 includes fetching the rows from the first query in step 501 and fetching the rows form the second query in step 502. Since no BASED ON or PRESERVE syntax is provided in the query 500, the processing in steps 503 (setting preserved columns) and 504 (setting preferred rows) need not be performed. The process then continues with step 505, executing the UNION query for the rows fetched in steps 501 and 502. In step 506, the result is output or provided to a requesting client device. Again, query 500 may be part of a larger query and thus the output step 506 may involve using the results for further processing.

Embodiments can improve query execution by adding certain steps or additional syntax to be read before preparing an optimal query execution or explain plan. Data retrieval from two or more queries normally remains the same. For example, steps 301 and 302 in FIG. 3 and steps 401 and 402 in FIG. 4 fetch data as specified by the SELECT queries in their respective enhanced queries shown in tables 300 and 400. Then, the database server sets flags for columns in the case that there are any to ignore and preserve for display before computing the uniqueness of all query data. This is reflected in step 303 in FIGS. 3 and 403 in FIG. 4 by reading the PRESERVE syntax in the respective enhanced queries shown in tables 300 and 400. Following this, the BASED ON syntax is read. In the case where a query asks to force display of the data from a particular one of the SELECT queries, such as in the enhanced query shown in table 300, duplicate data from other queries in memory can be scrapped or discarded. In the case where a condition or comparative operator is executed to show the appropriate data, such as in the enhanced query shown in table 400, the underlying indexes are used to perform join conditions and display the data.

Processing of enhanced queries will now be described below using the sample data shown in FIG. 6. FIG. 6 shows two tables, an employment master table 602 (M_Employment) and an employment transaction table 604 (T_Employment).

FIG. 7 depicts the results of processing a standard UNION operation in the query 700. The result table 702, as shown, prints two rows for the names A3 (ID 3) and A4 (ID 4) with different salaries. In some cases, this may be a desired result. In other cases, however, a client device querying a database server may want to force the output of one salary value for the names A3 and A4. To do this, enhanced queries may be used in some embodiments.

FIG. 8 shows enhanced query 800 that includes the BASED ON and PRESERVE syntax. This syntax specifies, in the PRESERVE clause, that the salary row from master table 602 and transaction table 604 should be ignored by specifying table names and row names from the master table 602 (e.g., Query_M.Salary) and the transaction table 604 (e.g., Query_T.Salary). The column values for the rows specified in the PRESERVE clause are stored in-memory by the database server as shown in tables 801-1 and 801-2. It is important to note that while master table 602 and transaction table 604 use the same column labels, this may not always be the case. For example, one table may use the label "Salary" while another table may use the label "Sal." The UNION operation is performed for the other rows in the SELECT queries of enhanced query 800, namely, MonthID, Name and ID.

For all unique combinations of MonthID, Name and ID in the rows of master table 602 and transaction table 604, the salary value for that unique row is output by fetching the information from table 801-1 or 801-2 as needed. By way of example, the rows for ID 1 and 2 are unique in the master table 602, and the row for ID 6 is unique in the transaction table 604. However, for duplicate combinations of MonthID, Name and ID in the rows of master table 602 and transaction table 604, the salary value output is controlled by the BASED ON syntax. In the example query 800, the BASED ON syntax specifies that the salary value for the transaction table 604 will be output for duplicate rows. Duplicate rows include the rows for ID 3, 4 and 5. The result table 802 reflects the output, with the unique rows 1, 2 and 6 taking the salary value from their respective source queries in the tables 801-1 and 801-2, and the duplicate rows for ID 3, 4 and 5 taking the salary value from the chosen source query (e.g., Query_T that utilizes transaction table 604) in table 801-2.

Conventionally, the UNION operator prints already common rows against duplicate rows. In some embodiments, the SELECT clause columns are categorized in two segments. The first segment columns are preferred values when two or more column values are found, e.g., two or more salary values in the example above. In the second segment, the BASED ON parameter is used for other select columns, e.g., MonthID, ID and Name in the example above. The BASED ON and PRESERVE syntax thus controls how different values of the first segment column are handled for duplicate second segment column values for rows. A duplicate row therefore refers to one in which there is more than one value of a first segment column against the set of second segment column values or identifiers.

The BASED ON syntax of enhanced query 800 reflects the choice of the client device providing the query. For example, it may be known that the transaction table 604 has new salary information that may not have been updated yet in the master table 602, hence the selection of transaction table 604 in the enhanced query 800. Consider, as another situation, one in which the client device wishes to output the higher of the two salary values. Such a situation may be handled using conditional BASED ON syntax, as will be described below with respect to FIG. 9.

More generally, enhanced database queries described herein allow for greater flexibility for database queries. Client devices, and the developers or other users that utilize client devices for querying a database server, may have knowledge about where functional, accurate or relevant data is stored in multiple tables. Based on this knowledge and utilizing enhanced database queries as described herein, the client device can select data which is made available in-memory. Thus, processing of operations such as the UNION operation are made less complex and thus can be performed faster as the execution plan steps are reduced at the first level of data retrieval. Intermediate stages can be added through the user of conditional syntax that funnel down buffer data (e.g., the column data stored in-memory) were data selection is chosen by the comparative operator over key columns. Thus, computing distinct rows is made more optimal as indexes can more effectively be used for compression criteria also improving performance.

Figure 9:
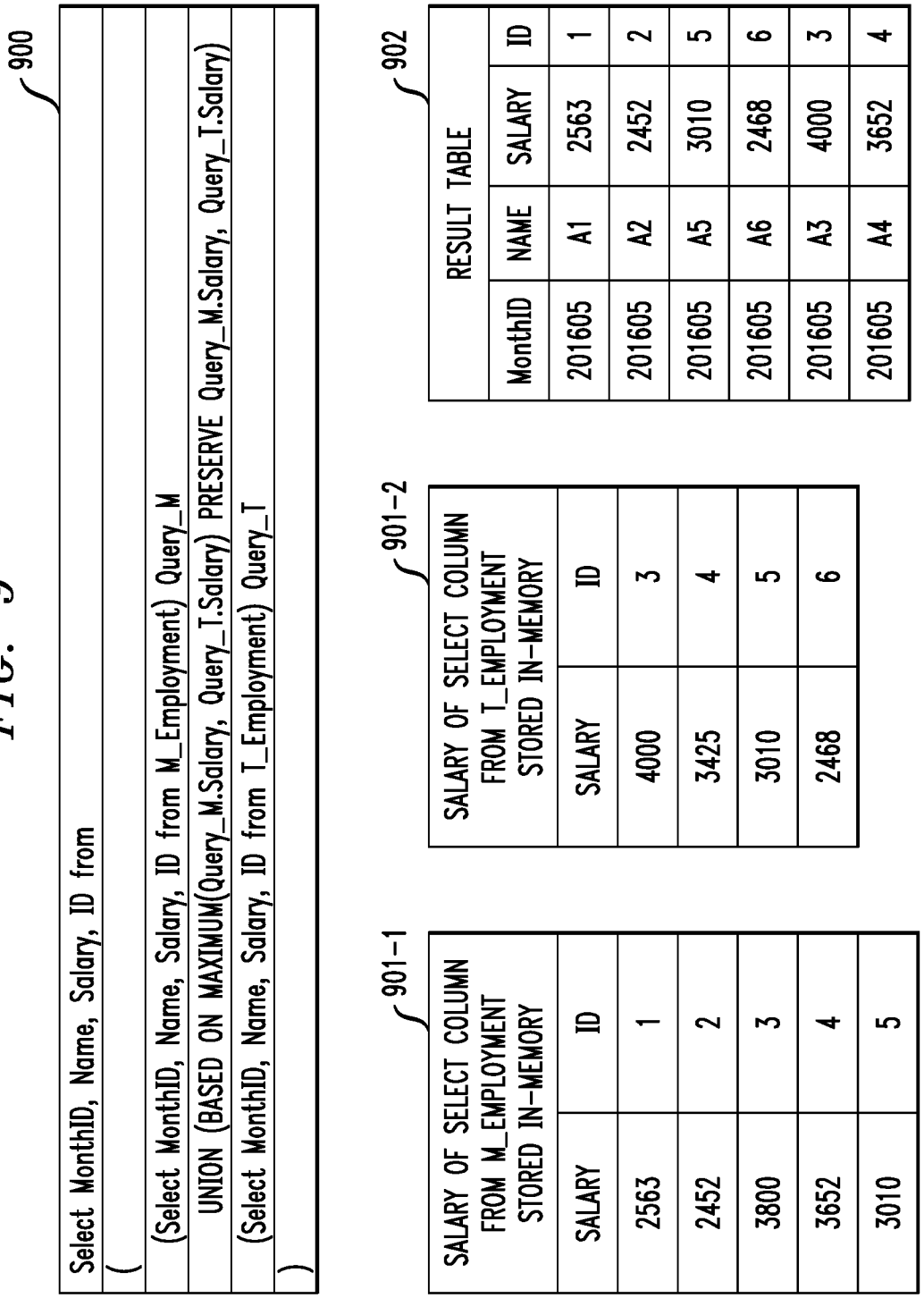
FIG. 9 depicts another example enhanced UNION database query using the sample tables of FIG. 6, according to an embodiment of the present invention.

FIG. 9 shows another enhanced query 900, where conditional BASED ON syntax is used. In the enhanced query 900, the BASED ON clause specifies that the maximum value for the Salary column is to be printed in the result table 902. The PRESERVE clause, similar to enhanced query 800, specifies that the salary row from master table 602 and transaction table 604 should be ignored by specifying table names and row names from the master table 602 (e.g., Query_M.Salary) and the transaction table 604 (e.g., Query_T.Salary). The column values for the rows specified in the PRESERVE clause are stored in-memory by the database server as shown in tables 901-1 and 901-2. The UNION operation is performed for the other rows in the SELECT queries of enhanced query 900, namely, MonthID, Name and ID.

For the unique combinations of MonthID, Name and ID in the rows of master table 602 and transaction table 604, the salary value for that unique row is output by fetching the information from table 901-1 or 901-2 as needed. By way of example, the rows for ID 1 and 2 are unique in the master table 602, and the row for ID 6 is unique in the transaction table 604. However, for duplicate combinations of MonthID, Name and ID in the rows of master table 602 and transaction table 604, the salary value output is controlled by the conditional BASED ON syntax. In the example query 900, the conditional BASED ON syntax specifies that the maximum salary value should be output. The duplicate rows include the rows for ID 3, 4 and 5. For ID 3, the maximum value is in transaction table 604, and thus the salary value for this row is fetched from table 901-2 stored in-memory at the database server. For ID 4, the maximum value is in master table 602, and thus the salary value for this row is fetched from table 901-1. For ID 5, the salary value is the same in both the master table 602 and the transaction table 604, and thus the common salary value 3010 will be printed.

FIG. 10 depicts the results of processing another standard UNION operation in the query 1000. The result table 1002, as shown, prints multiple rows for certain names (e.g., A3 and A4) that have different locations in the master table 602 and transaction table 604. In some cases, this may be a desired result. In some cases, however, a client device querying a database server may want to condition the output in the result table. The enhanced query 1100 shown in FIG. 11 shows an example of conditioning the output.

Enhanced query 1100 includes conditional BASED ON and PRESERVE syntax. This syntax specifies, in the PRESERVE clause, that the location row from the master table 602 and the transaction table 604 should be ignored by specifying table names and row names from the master table 602 (e.g., Query_M.Location) and transaction table 604 (e.g., Query_T.Location). The column values for the rows specified in the PRESERVE clause are stored in-memory by the database server as shown in tables 1101-1 and 1101-2. Again, it is important to note that the column labels do not need to be identical. As an example, one table may use the label "Location" while another table may use the label (Loc.). The UNION operation is performed for the other rows in the SELECT queries of enhanced query 1100, namely, MonthID, Name and ID.

For unique combinations of MonthID, Name and ID in the rows of master table 602 and transaction table 604, the location value for that unique row is output. By way of example, in the result table 1102, the rows for ID 1 and 2 are unique in master table 602 and the row for ID 6 is unique in transaction table 604, and thus the location values for such rows are fetched from the tables 1101-1 and 1101-2 stored in-memory at the database server. For duplicate combinations of MonthID, Name and ID in the rows of master table 602 and transaction table 604, the conditional BASED ON syntax is used to determine the location value that is output in result table 1102. In the enhanced query 1100, the conditional BASED ON syntax specifies that, when the queries Query_M and Query_T have different location values, the output should be that of Query_T on the left-hand side of the comparative operator !=. This is reflected in the result table 1102, where the rows for ID 3 and 4 utilize the location value from the transaction table 604 that are stored in-memory in table 1101-2. The row for ID 5 does not meet this condition, as its location value is the same in the master table 602 and transaction table 604. As such, the common row value for the location, i.e., Melbourne, is printed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 12:
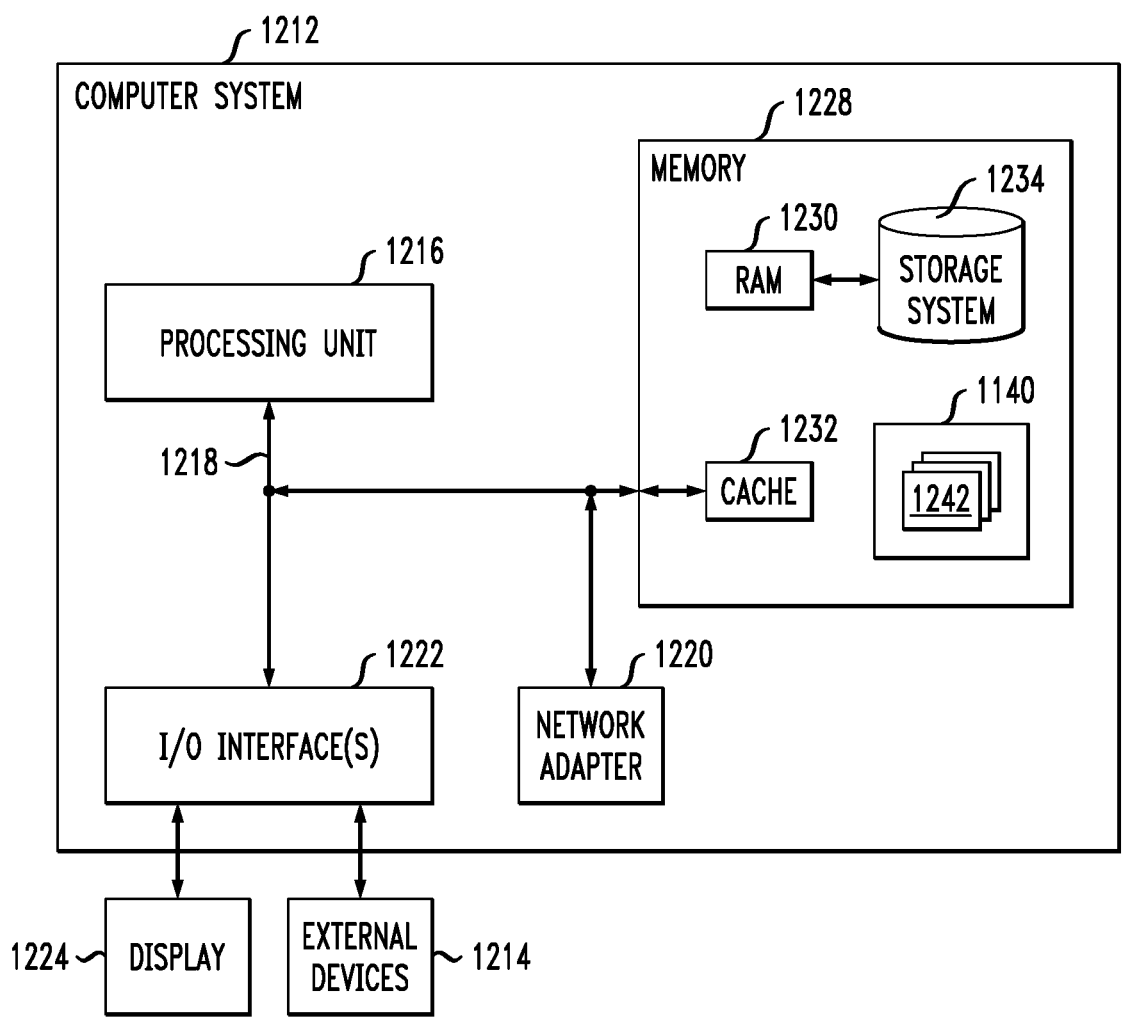
FIG. 12 depicts a computer system in accordance with which one or more components/steps of techniques of the invention may be implemented, according to an embodiment of the present invention.

One or more embodiments can make use of software running on a general-purpose computer or workstation. With reference to FIG. 12, in a computing node 1210 there is a computer system/server 1212, which is operational with numerous other general purpose or special purpose computing system environments or configurations. Examples of well-known computing systems, environments, and/or configurations that may be suitable for use with computer system/server 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 1212 in computing node 1210 is shown in the form of a general-purpose computing device. The components of computer system/server 1212 may include, but are not limited to, one or more processors or processing units 1216, a system memory 1228, and a bus 1218 that couples various system components including system memory 1228 to processor 1216.

The bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 1212 typically includes a variety of computer system readable media. Such media may be any available media that is accessible by computer system/server 1212, and it includes both volatile and non-volatile media, removable and non-removable media.

The system memory 1228 can include computer system readable media in the form of volatile memory, such as random access memory (RAM) 1230 and/or cache memory 1232. The computer system/server 1212 may further include other removable/non-removable, volatile/nonvolatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1218 by one or more data media interfaces. As depicted and described herein, the memory 1228 may include at least one program product having a set (e.g., at least one) of program modules that are configured to carry out the functions of embodiments of the invention. A program/utility 1240, having a set (at least one) of program modules 1242, may be stored in memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer system/server 1212 may also communicate with one or more external devices 1214 such as a keyboard, a pointing device, a display 1224, etc., one or more devices that enable a user to interact with computer system/server 1212, and/or any devices (e.g., network card, modem, etc.) that enable computer system/server 1212 to communicate with one or more other computing devices. Such communication can occur via I/O interfaces 1222. Still yet, computer system/server 1212 can communicate with one or more networks such as a LAN, a general WAN, and/or a public network (e.g., the Internet) via network adapter 1220. As depicted, network adapter 1220 communicates with the other components of computer system/server 1212 via bus 1218. It should be understood that although not shown, other hardware and/or software components could be used in conjunction with computer system/server 1212. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
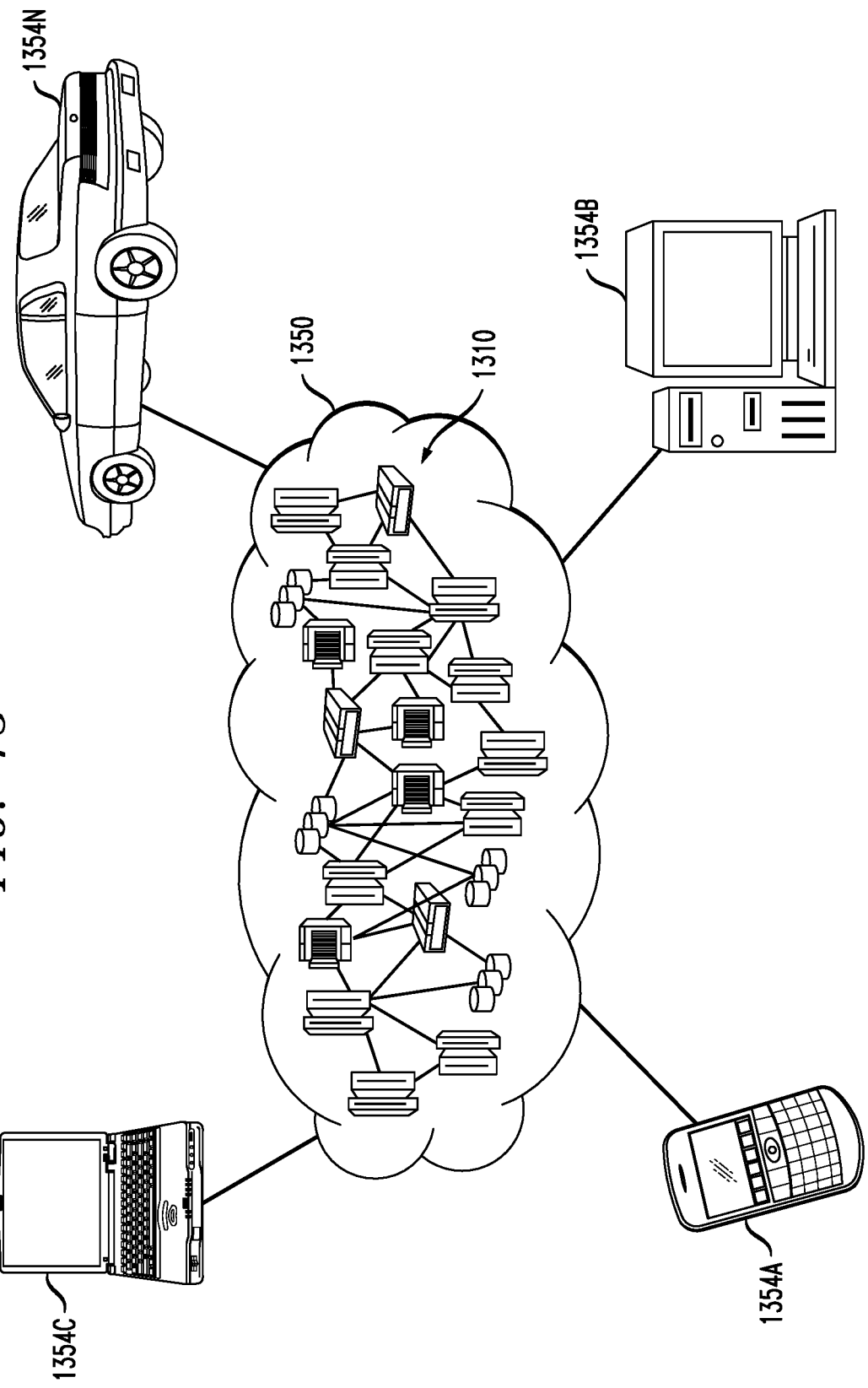
FIG. 13 depicts a cloud computing environment, according to an embodiment of the present invention.

Referring now to FIG. 13, illustrative cloud computing environment 1350 is depicted. As shown, cloud computing environment 1350 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1350 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1350 can communicate with any type of computerized device over any type of network and/or network addressable connection (e.g., using a web browser).

Figure 14:
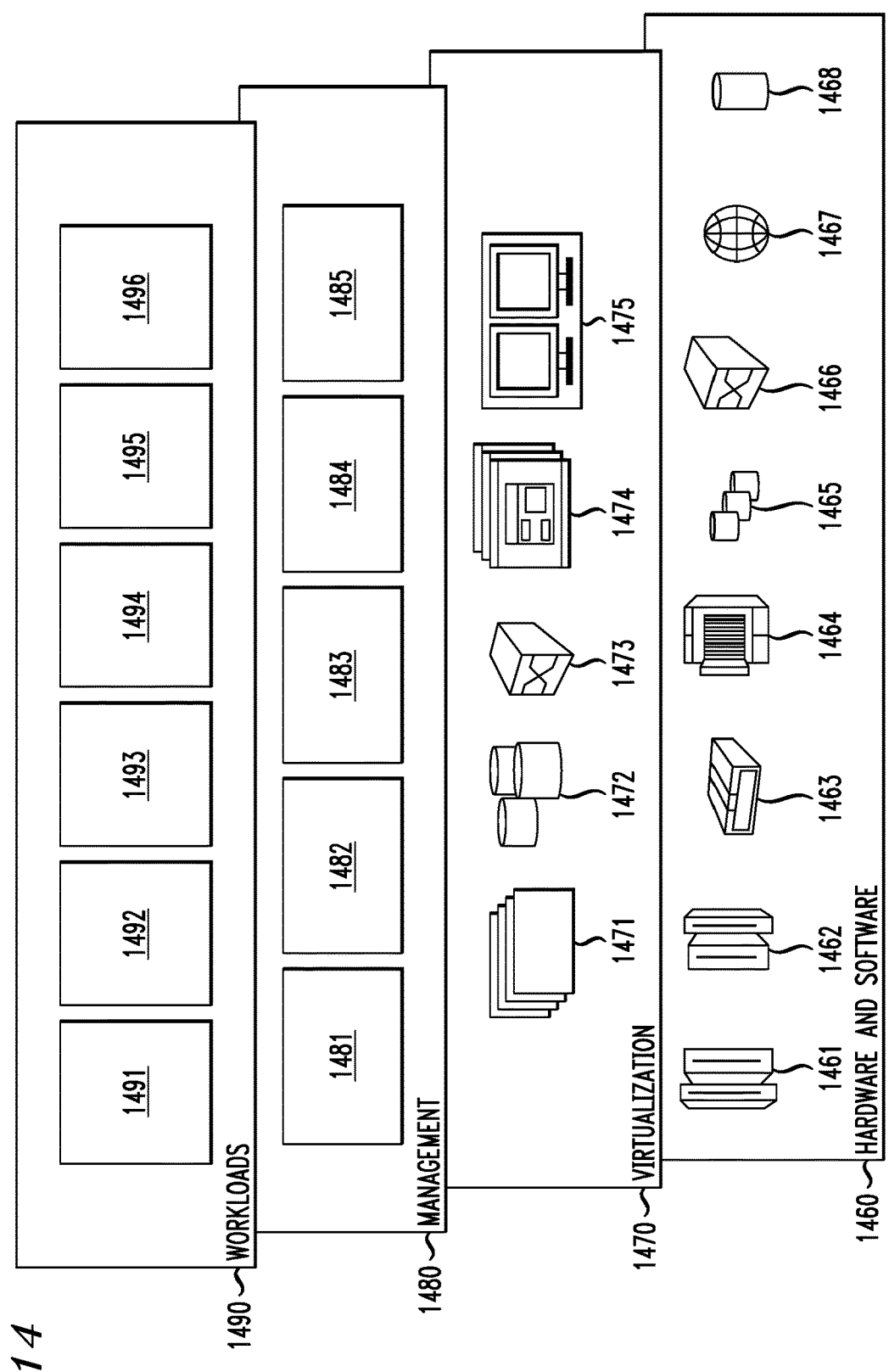
FIG. 14 depicts abstraction model layers, according to an embodiment of the present invention.

Referring now to FIG. 14, a set of functional abstraction layers provided by cloud computing environment 1350 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and enhanced database query processing 1496, which may perform various functions described above with respect to providing enhanced database query execution.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, from a client device, an enhanced database query for a union operation of a first query specifying one or more select statements for a first table and at least a second query specifying one or more select statements for at least a second table different than the first table;
parsing the enhanced database query to identify two or more parameters controlling handling of duplicate rows from the first table in the first query and from the second table in the second query, the two or more parameters comprising a first parameter controlling selection of a given one of the duplicate rows from the first table or the second table, and a second parameter specifying one or more columns in the first table and the second table to ignore while performing the union operation;
evaluating the enhanced database query utilizing the parameters to generate a result table; and
providing the result table to the client device;
wherein the result table comprises, for a given duplicate row present in the first table and the second table, a version of the given duplicate row from the selected one of the first table and the second table specified by the first parameter;
wherein the first parameter specifies a comparative operator between a first column value of the first query and a second column value of the second query;
wherein the ignored columns of the first table and the second table are stored in-memory while evaluating the enhanced database query;
wherein evaluating the enhanced database query comprises:
setting a flag to ignore the one or more columns specified in the second parameter when processing the union operation;
processing the union operation for the first query and the second query to obtain unique rows from the first table and the second table and to obtain a preferred row from one of the first table and the second table for duplicate rows in the first query and the second query, the preferred row being determined based on the first parameter; and
generating the result table comprising the unique rows and the preferred rows, wherein column values for the one or more ignored columns in the result table are obtained from the columns of the first table and the second table stored in-memory based on the comparative operator specified in the first parameter; and
wherein the method is performed by at least one processing device comprising a processor coupled to a memory.

2. The method of claim 1, wherein the comparative operator is not equal to.

3. The method of claim 1, wherein the comparative operator is one of: a maximum value; and a minimum value.

4. The method of claim 1, wherein the enhanced database query comprises a format of UNION (BASED ON <parameter-1> PRESERVE <parameter-2>), wherein <parameter1> is the first parameter and <parameter2> is the second parameter.

5. The method of claim 4, wherein the first parameter <parameter1> lists a first column from one of the first query and the second query on a left side of the comparative operator and a second column from the other one of the first query and the second query on the second side of the comparative operator.

6. The method of claim 4, wherein the second parameter <parameter2> lists column names from the first table and the second table separated by commas.

7. The method of claim 4, wherein the first parameter comprises two or more different comparative operators.

8. An apparatus comprising:
a processing device comprising a processor coupled to a memory;
the processing device being configured:
to receive, from a client device, an enhanced database query for a union operation of a first query specifying one or more select statements for a first table and at least a second query specifying one or more select statements for at least a second table different than the first table;
to parse the enhanced database query to identify two or more parameters controlling handling of duplicate rows from the first table in the first query and from the second table in the second query, the two or more parameters comprising a first parameter controlling selection of a given one of the duplicate rows from the first table or the second table, and a second parameter specifying one or more columns in the first table and the second table to ignore while performing the union operation;
to evaluate the enhanced database query utilizing the parameters to generate a result table; and
to provide the result table to the client device;
wherein the result table comprises, for a given duplicate row present in the first table and the second table, a version of the given duplicate row from the selected one of the first table and the second table specified by the first parameter;
wherein the first parameter specifies a comparative operator between a first column value of the first query and a second column value of the second query;
wherein the ignored columns of the first table and the second table are stored in-memory while evaluating the enhanced database query; and
wherein the processing device is configured to evaluate the enhanced database query by:
setting a flag to ignore the one or more columns specified in the second parameter when processing the union operation;
processing the union operation for the first query and the second query to obtain unique rows from the first table and the second table and to obtain a preferred row from one of the first table and the second table for duplicate rows in the first query and the second query, the preferred row being determined based on the first parameter; and
generating the result table comprising the unique rows and the preferred rows, wherein column values for the one or more ignored columns in the result table are obtained from the columns of the first table and the second table stored in-memory based on the comparative operator specified in the first parameter.

9. The apparatus of claim 8, wherein the processing device comprises a database server.

10. The apparatus of claim 9, wherein the database server is coupled to the client device over at least one network.

11. The apparatus of claim 8, wherein the comparative operator is not equal to.

12. The apparatus of claim 8, wherein the comparative operator is one of: a maximum value; and a minimum value.

13. The apparatus of claim 8, wherein the enhanced database query comprises a format of UNION (BASED ON <parameter-1> PRESERVE <parameter-2>), wherein <parameter1> is the first parameter and <parameter2> is the second parameter.

14. The apparatus of claim 8, wherein the first parameter <parameter1> lists a first column from one of the first query and the second query on a left side of the comparative operator and a second column from the other one of the first query and the second query on the second side of the comparative operator.

15. The apparatus of claim 8, wherein the second parameter <parameter2> lists column names from the first table and the second table separated by commas.

16. The apparatus of claim 8, wherein the first parameter comprises two or more different comparative operators.

17. A computer program product comprising a computer readable storage medium for storing computer readable program code which, when executed, causes a computer:
to receive, from a client device, an enhanced database query for a union operation of a first query specifying one or more select statements for a first table and at least a second query specifying one or more select statements for at least a second table different than the first table;
to parse the enhanced database query to identify two or more parameters controlling handling of duplicate rows from the first table in the first query and from the second table in the second query, the two or more parameters comprising a first parameter controlling selection of a given one of the duplicate rows from the first table or the second table, and a second parameter specifying one or more columns in the first table and the second table to ignore while performing the union operation;
to evaluate the enhanced database query utilizing the parameters to generate a result table; and
to provide the result table to the client device;
wherein the result table comprises, for a given duplicate row present in the first table and the second table, a version of the given duplicate row from the selected one of the first table and the second table specified by the first parameter;
wherein the first parameter specifies a comparative operator between a first column value of the first query and a second column value of the second query;
wherein the ignored columns of the first table and the second table are stored in-memory while evaluating the enhanced database query;

wherein evaluating the enhanced database query comprises:

setting a flag to ignore the one or more columns specified in the second parameter when processing the union operation;

processing the union operation for the first query and the second query to obtain unique rows from the first table and the second table and to obtain a preferred row from one of the first table and the second table for duplicate rows in the first query and the second query, the preferred row being determined based on the first parameter; and generating the result table comprising the unique rows and the preferred rows, wherein column values for the one or more ignored columns in the result table are obtained from the columns of the first table and the second table stored in-memory based on the comparative operator specified in the first parameter.

18. The computer program product of claim 17, wherein the comparative operator comprises at least one of: not equal to; a maximum value; and a minimum value.

19. The computer program product of claim 17, wherein the enhanced database query comprises a format of UNION (BASED ON <parameter-1> PRESERVE <parameter-2>), wherein <parameter1> is the first parameter and <parameter2> is the second parameter, wherein the first parameter <parameter1> lists a first column from one of the first query and the second query on a left side of the comparative operator and a second column from the other one of the first query and the second query on the second side of the comparative operator, and wherein the second parameter <parameter2> lists column names from the first table and the second table separated by commas.

20. The computer program product of claim 17, wherein the first parameter comprises two or more different comparative operators.

* * * * *